US010030993B2

(12) United States Patent
Barfield

(10) Patent No.: US 10,030,993 B2
(45) Date of Patent: Jul. 24, 2018

(54) METHOD AND SYSTEM FOR DETERMINING WHETHER STEPS HAVE OCCURRED

(71) Applicant: HTI IP, LLC, Atlanta, GA (US)

(72) Inventor: James R. Barfield, Atlanta, GA (US)

(73) Assignee: Verizon Connect Inc., Atlanta, GA (US)

( * ) Notice: Subject to any disclaimer, the term of this patent is extended or adjusted under 35 U.S.C. 154(b) by 635 days.

(21) Appl. No.: 14/069,194

(22) Filed: Oct. 31, 2013

(65) Prior Publication Data

US 2014/0188431 A1 Jul. 3, 2014

Related U.S. Application Data

(60) Provisional application No. 61/721,319, filed on Nov. 1, 2012.

(51) Int. Cl.
*G01C 22/00* (2006.01)
*G01C 5/06* (2006.01)

(52) U.S. Cl.
CPC ............ *G01C 22/006* (2013.01); *G01C 5/06* (2013.01)

(58) Field of Classification Search
CPC ........... G01C 22/006; G01C 5/00; G01C 5/06
See application file for complete search history.

(56) References Cited

U.S. PATENT DOCUMENTS

| 6,018,705 | A | * | 1/2000 | Gaudet | A61B 5/1121 235/105 |
| 6,700,499 | B2 | * | 3/2004 | Kubo | G01C 22/006 340/573.1 |
| 6,941,239 | B2 | * | 9/2005 | Unuma | A43B 3/0005 340/8.1 |
| 7,169,084 | B2 | * | 1/2007 | Tsuji | G01C 22/006 482/1 |
| 7,811,203 | B2 | * | 10/2010 | Unuma | G01C 22/006 482/1 |

(Continued)

OTHER PUBLICATIONS

John, Dinesh et al. "Biomechanical Examination of the 'Plateau Phenomenon' in ActiGraph Vertical Activity Counts." Physiological Measurement 33.2 (2012): 219-230. PMC.*

*Primary Examiner* — Alexander Satanovsky
*Assistant Examiner* — Lina Cordero

(57) ABSTRACT

A filter processes acceleration magnitude signals from an accelerometer device to output spectral content related to walking and running. A device containing the accelerometer determines steps by qualitatively analyzing the processed acceleration signals to determine whether increased acceleration magnitude results from a step impact from running or walking activity. The device may analyze the acceleration signals to determine crossings of an axis at zero magnitude, which crossings typically correspond to a person's foot impacting the ground, and may analyze the period between the zero crossings. The step count can indicate whether the device, in a height determination mode, is moving in a vehicle; if analysis of accelerometer signals indicates no stepping or running, but another circuit of the device indicates rapid movement, the device assumes it is moving in a vehicle, and resets a height above ground value to zero upon determining resumption of walking or running activity.

20 Claims, 8 Drawing Sheets

(56) References Cited

U.S. PATENT DOCUMENTS

| | | | | |
|---|---|---|---|---|
| 7,881,902 B1* | 2/2011 | Kahn | ............... | G01C 22/006 |
| | | | | 377/24.2 |
| 7,930,135 B2* | 4/2011 | Ma | ............... | G01C 22/006 |
| | | | | 702/160 |
| 2003/0018430 A1* | 1/2003 | Ladetto | ............... | G01C 21/16 |
| | | | | 701/472 |
| 2007/0072158 A1* | 3/2007 | Unuma | ............... | G01C 22/006 |
| | | | | 434/247 |
| 2007/0143068 A1* | 6/2007 | Pasolini | ............... | G01C 22/006 |
| | | | | 702/160 |
| 2007/0143069 A1* | 6/2007 | Pasolini | ............... | G01C 22/006 |
| | | | | 702/160 |
| 2010/0004860 A1* | 1/2010 | Chernoguz | ............... | G01C 22/006 |
| | | | | 701/494 |
| 2013/0085700 A1* | 4/2013 | Modi | ............... | G01C 22/006 |
| | | | | 702/104 |
| 2013/0085711 A1* | 4/2013 | Modi | ............... | G01C 22/006 |
| | | | | 702/141 |
| 2013/0090881 A1* | 4/2013 | Janardhanan | ............... | G01C 22/006 |
| | | | | 702/104 |
| 2013/0332108 A1* | 12/2013 | Patel | ............... | G01C 22/006 |
| | | | | 702/160 |
| 2014/0074431 A1* | 3/2014 | Modi | ............... | G01C 22/006 |
| | | | | 702/160 |
| 2014/0172351 A1 | 6/2014 | Barfield et al. | | |

* cited by examiner

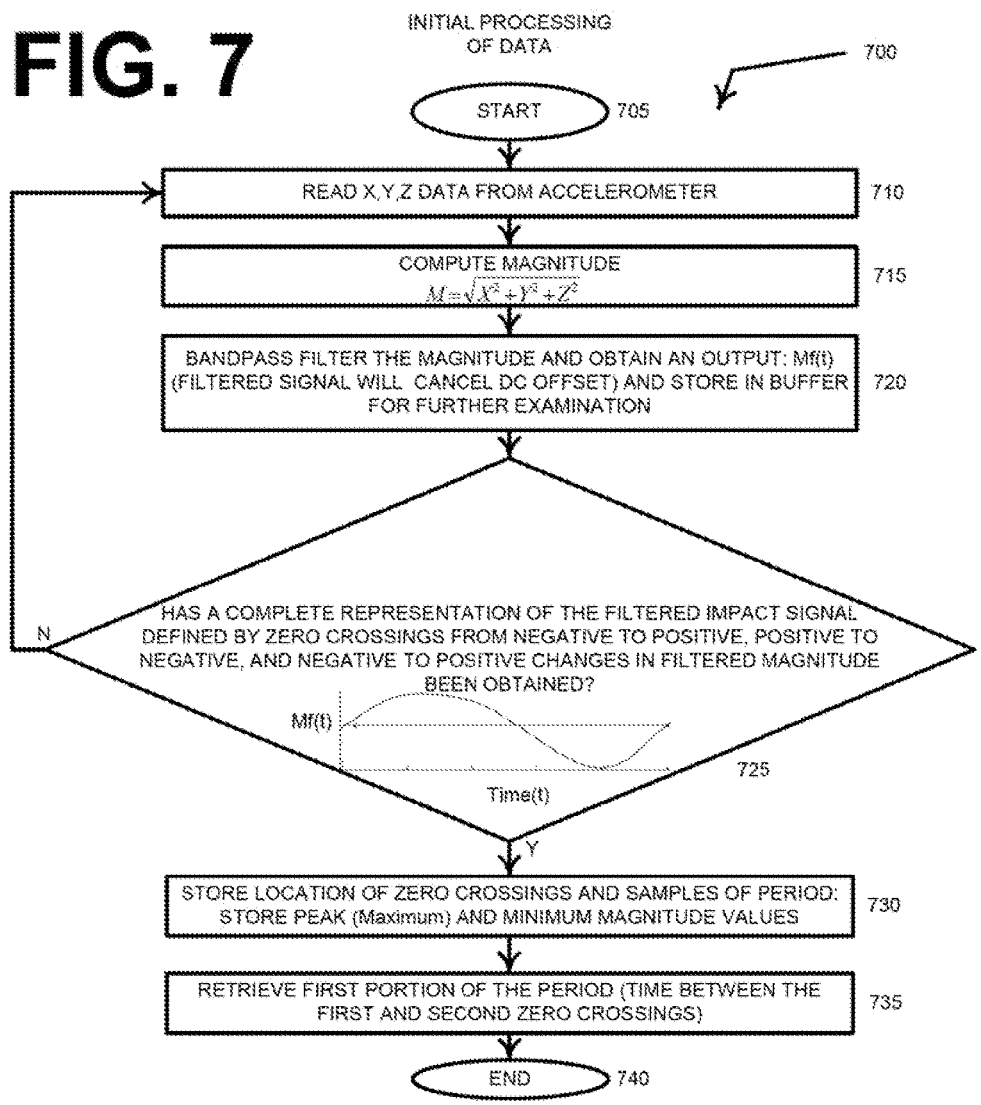

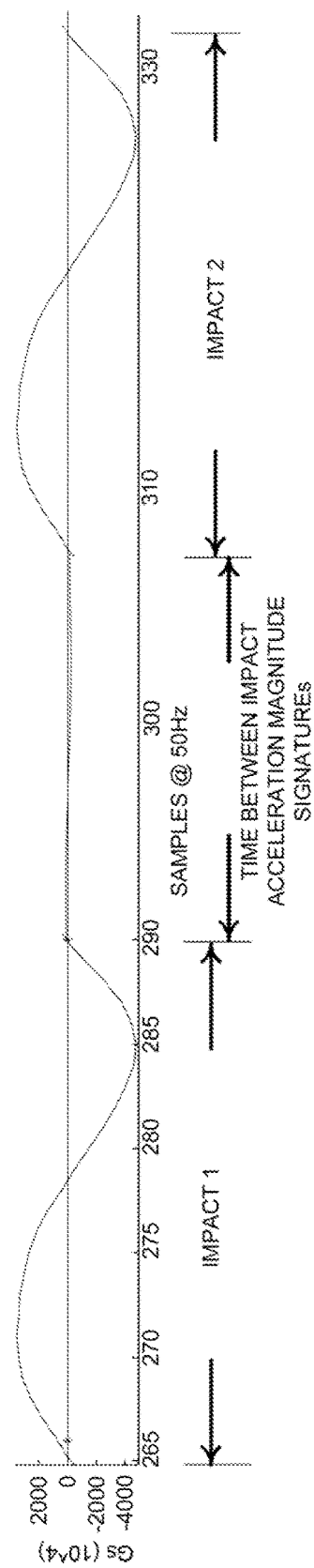

METHOD AND SYSTEM FOR DETERMINING WHETHER STEPS HAVE OCCURRED

CROSS REFERENCE TO RELATED APPLICATIONS

This application claims priority under 35 U.S.C. § 119(e) to U.S. Provisional Patent Application No. 61/721,319, entitled "Method and system for determining whether to reset a height determining device based on the occurrence of steps," and having a filing date of Nov. 1, 2012.

BRIEF DESCRIPTION OF THE DRAWINGS

FIG. 7 illustrates a method contained in method 100 to sample and process X, Y, Z data from an accelerometer for the purposes of detection a step in the signal.

FIG. 8 illustrates a graphical depiction of an accelerometer magnitude signal that has detected two step impacts, and the time between the ending of the first and beginning of the second.

DETAILED DESCRIPTION

Figure 1:
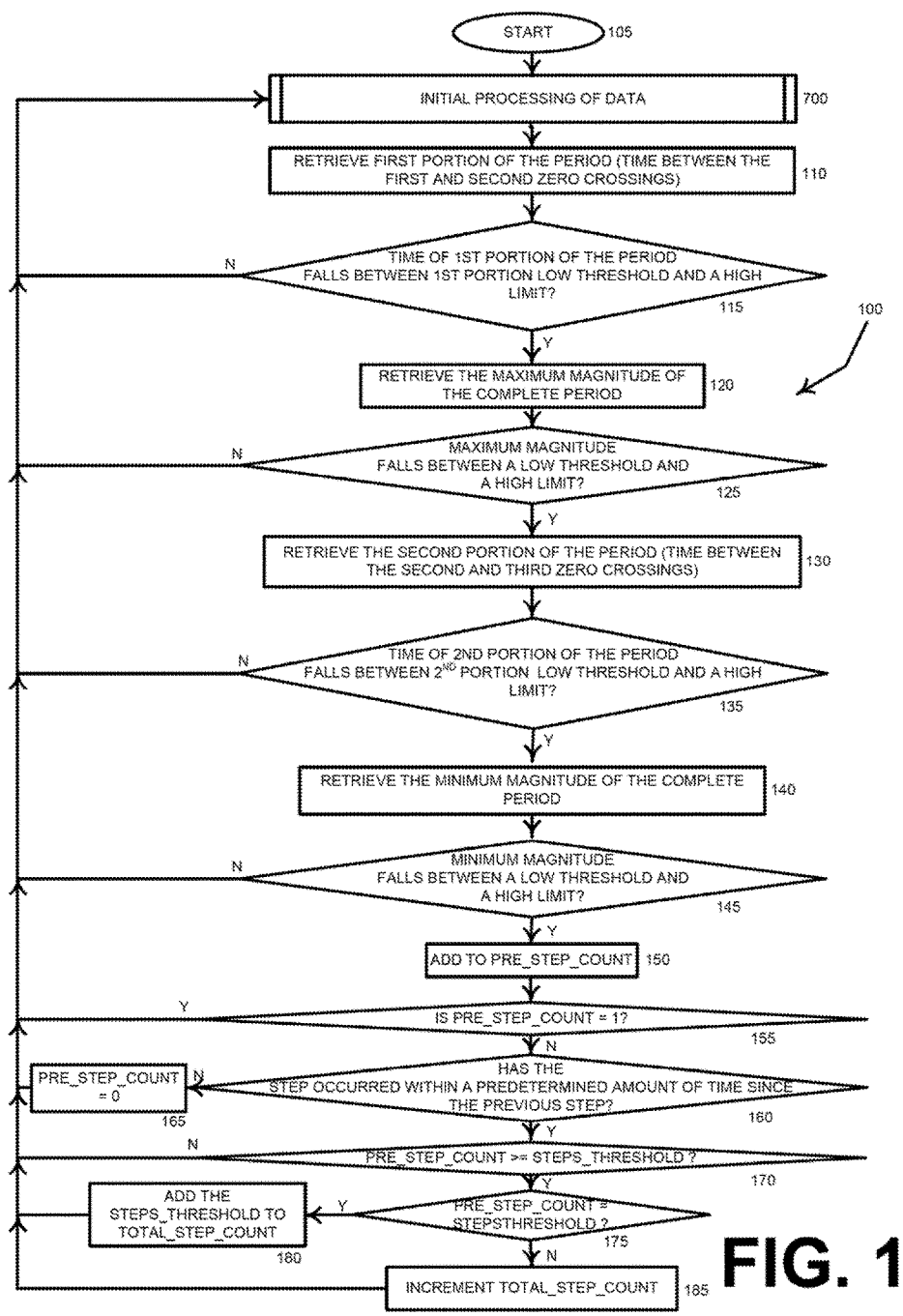
FIG. 1 illustrates a flow diagram of a method for counting steps by using a microprocessor and an accelerometer.
Figure 4:
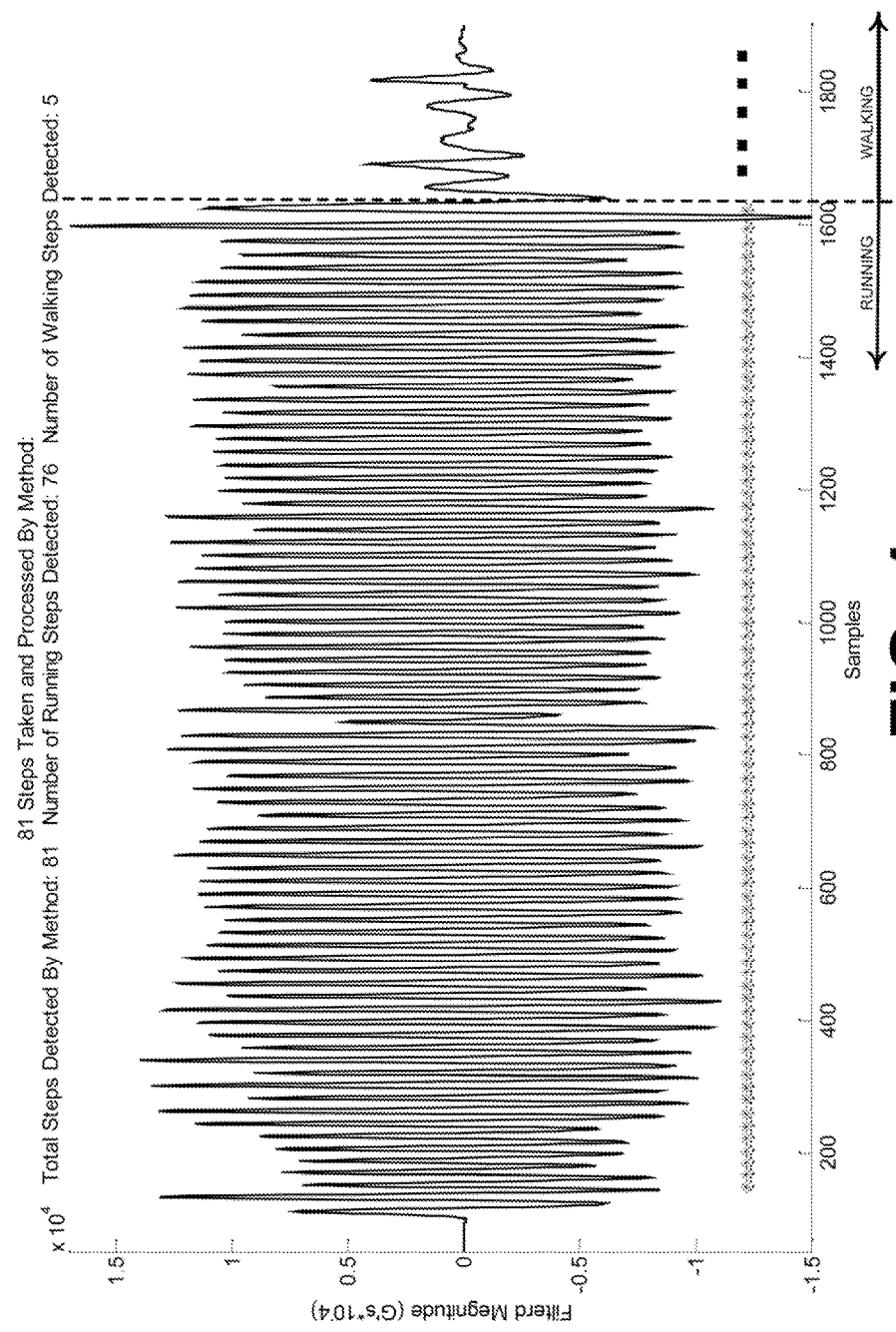
FIG. 4 illustrates a plot of acceleration data that shows method 200's ability to detect walking and running steps from filtered acceleration data.

The drawing pictured in FIG. 1 illustrates method 100 for detecting when a step has occurred based on an acceleration magnitude calculation of sampled acceleration data. The method starts at step 100 and advances to step 700, where the method causes a processor to perform initial processing of sampled acceleration data corresponding to a step impact during a walking or running activity. During step 700, shown in greater detail in FIG. 7, the processor coupled to various sensors acquires samples of data from an accelerometer and determines the magnitude of each sample. The magnitude is determined as the square root of the sum of the squares of the x-axis, the y-axis, and the z-axis data from a three-axis accelerometer, for example. For detecting only step activity, a one-axis or two-axis accelerometer may be sufficient. In the figure (see FIG. 7 for more detail), the outputted accelerometer signal is used and the magnitude of the x-axis, the y-axis, and the z-axis data is then filtered with a band pass filter. The band pass filter's cutoff frequencies are determined from the low frequency determined from the slowest walking threshold selected according to a desired slow walking speed, and the upper frequency cutoff is determined by comparing data to the fastest walking or running threshold that correspond to a rate that is selected as a desired high running speed. More information on choosing/selecting, the cutoff frequencies are described infra. Method 700, illustrated in FIG. 7 and referred to by step 700 in FIG. 1, continues by obtaining the samples of filtered magnitude data that correspond to three zero crossings of the signal (negative to positive, positive to negative, and negative to positive values). The final zero crossing occurring for a given step impact signature is typically used as the first zero crossing for the signature representing the next potential step impact signature obtained from filtered magnitude acceleration data (impact signature defined as sampled acceleration data between the two zero crossings). As shown in FIG. 4, the running portion shows filtered step impact signatures for repetitive step impacts. The running steps occur at roughly a consistent rate (i.e., the runner has a consistent gait tempo and stride length and the group of signatures appears roughly as a periodic sinusoidal signal). The third zero crossing for a given step impact signature in FIG. 4 becomes the first zero crossing for the immediately successive step impact signature. One of ordinary skill will appreciate that a given potential step impact signature may not meet criteria that qualifies it as resulting from a step impact. Thus, although the third zero crossing of the immediately preceding signature may be from a step impact signature, and the given potential step impact signature may not result from a step impact, the first zero crossing of the given potential step impact signature, as well as the second and third, are evaluated as defining a potential step impact signature to determine whether the given signature represents a step impact. Such a scenario is illustrated in FIG. 8 where a non step event signature (perhaps caused by low magnitude noise) occurs between the third zero crossing of the period of the first step impact signature (Impact 1) and the first zero crossing of the period of the second step impact signature (Impact 2). The third zero crossing of the first step impact signature is used as the first zero crossing of the non step event. In the figure, this zero crossing appears to occur at approximately 290 samples, and the second and third zero crossings of the non-step event signature appear to occur at approximately 298 and 308 samples respectively. Thus, the first zero crossing of the second step impact signature (Impact 2) also occurs at 308 samples. (Samples is a proxy for time, thus the x-axis in the graph represents time.) The amount of time or the number of samples is determined between the zero crossings. The values contained within each period are preferably referred to as the first portion of the signature period and the second portion of the signature period. However, the term period as used in reference to a step impact signature refers to the time between the beginning and end of an impact event where the acceleration magnitude value crosses the zero axis going from negative to positive. Thus, method 700 collects an entire period, or duration of an impact event, of a band pass filtered signal and extracts relevant information from the signal containing the peak and minimum magnitudes for the first and second half periods, or portions, before proceeding to RETURN.

Continuing with description of FIG. 1, at step 115 the first portion (first half period) periods are compared to a low time threshold (minimum time threshold) and a high time limit to make sure that the first portion of the impact signature period falls within a range that typical walking occurs. For purposes of discussion, the terms limit and threshold may be used interchangeably herein, but 'limit' generally refers to a maximum value not-to-exceed and a 'threshold' generally refers to a minimum value to-be-met. The first portion/half period time threshold and limit value ranges are determined from evaluating filtered accelerometer signals empirically acquired during multiple stepping movements at walking and running speeds. Baseline walking data typically exhibits ranges of temporally longer impact event signatures relative to ranges of temporally shorter impact event signatures that indicate faster walking or running speeds. At step 120, the maximum filtered magnitude value within the first portion of the signature period is calculated from retrieved/received magnitude data samples. The maximum filtered magnitude value determined at step 120 is compared to low and high magnitude threshold/limit values at step 125. These threshold and limit values provide a range of amplitudes empirically determined from multiple sets of walking and running data previously acquired and analyzed. In the aspect illustrated in FIG. 1, the larger magnitude threshold value (i.e., maximum maximum magnitude threshold) represents the largest impact typically determined empirically as indicating fast walking or running steps and the low magnitude threshold value (minimum maximum magnitude threshold) is the smallest amplitude value determined for slow walking data.

At step 130, the processor retrieves stored samples of data corresponding to the second portion (second half period) of the impact event signature period. The second portion of the period is calculated in order to compare at step 135 with low and high period time threshold values. These values are empirically determined from accelerometer data to extract a second half period maximum time from fast walking or running and a second half period minimum time from slow walking. The minimum amplitude of filtered magnitude found within the second half period is determined at step 140 and compared at step 145 to a low minimum limit (minimum minimum magnitude threshold) and a high minimum threshold (maximum minimum magnitude threshold) (in the preferred embodiment these values have negative magnitude and thus a limit is the value not to exceed in the negative direction and the threshold is the value to meet, which has a lower absolute value than the threshold value not to exceed). If the period of the second half period falls within the minimum and maximum second half period time threshold values at step 135, and the minimum amplitude during the second half period falls within the two second-portion thresholds/limits/criteria at step 145, then an indication that a step has occurred is generated. A PRE_STEP_COUNT variable is updated/incremented at step 150 to include not only counts of previous steps taken but an additional step— the one just indicated by meeting the criteria of steps 115, 125, 135, and 145 and thus following the 'Y' paths there from. If the determination is made at step 155 that PRE_STEP_COUNT is equal to 1, then the method goes back to collecting more accelerometer data and determining if another step has occurred. If the PRE_STEP_COUNT value or buffer containing said value does not indicate that a step has occurred within a predetermined amount of time then the pre step buffer is set to zero at step 165 and method 100 returns to step 700. If the just-indicated-step did not occur within a predetermined amount of time since a immediately previous step, PRE_STEP_COUNT is set to 0 at step 165 before returning to step 700 ensures that a non-step event does not cause an a total steps counter of a pedometer algorithm to increment and thus erroneously count a non-step as a step. Thus, the predetermined period used in the comparison at step 160 is selected based on empirical data as time interval between a normal person's gait-step tempo. It will be appreciated that the predetermined step tempo period can be adjusted based on an individual's particular gait, or an average value can be used, so that the comparison of time between potential step events and the predetermined period does not record a non-step as a step in an overall pedometer counter value (a typical time values chosen would be 2 seconds). Otherwise, if a given step event occurs within the predetermined step tempo interval period, as determined at step 160, then method 100 advances to step 170, where it causes the processor to compare the PRE STEP COUNT value to a step threshold value. If the number in the PRE_STEP_COUNT does not equal, or exceed, a predetermined number of steps threshold, within the predetermined period as determined in step 160, then method 100 returns to step 700 and continues processing data. If, however, the number in the PRE_STEP_COUNT equals, or exceeds, the predetermined number of steps threshold as determined at step 170, within the predetermined period as determined in step 160, then method 100 advances to step 175, where it determines whether the number in the PRE_STEP_COUNT equals the predetermined number of steps threshold within the predetermined period as determined in step 160. If the determination at step 175 is yes, or 'Y', then the value stored in the pre-step-count variable is added at step 180 to the total step count, which is typically a running total of steps taken by a wearer of a pedometer device, or user of a mobile device, performing method 100 following an event, such as, for examples, resetting of the step count by a user, or turning on the device. If the determination at step 175 was no or 'N', (because the number of counts in the pre-step-count variable is greater than the predetermined STEPS_THRESHOLD) method 100 increments the TOTAL_STEP_COUNT variable of the pedometer device at step 185 then returns to step 700. Assuming each successive step indication occurs within the predetermined period as determined at step 160, step 185 will typically be the step where each step is recorded to the TOTAL_STEP_COUNT. If the user stops walking, PRE_STEP_COUNT is reset at 165 because a step did not occur within a specified time as determined at step 160. Because PRE_STEP_COUNT is reset to zero, the method is able to start again the process of waiting for a predetermined number of steps to occur before adding them to the TOTAL_STEP_COUNT. By waiting for a predefined number of steps to occur before adding the steps to a TOTAL_STEP_COUNT, the method limits the number of steps falsely determined as steps. Possible activities, or events, that might otherwise be determined as steps (either walking or running) include: bumping the device, shaking the device, or other short and quick movements.

Figure 2:
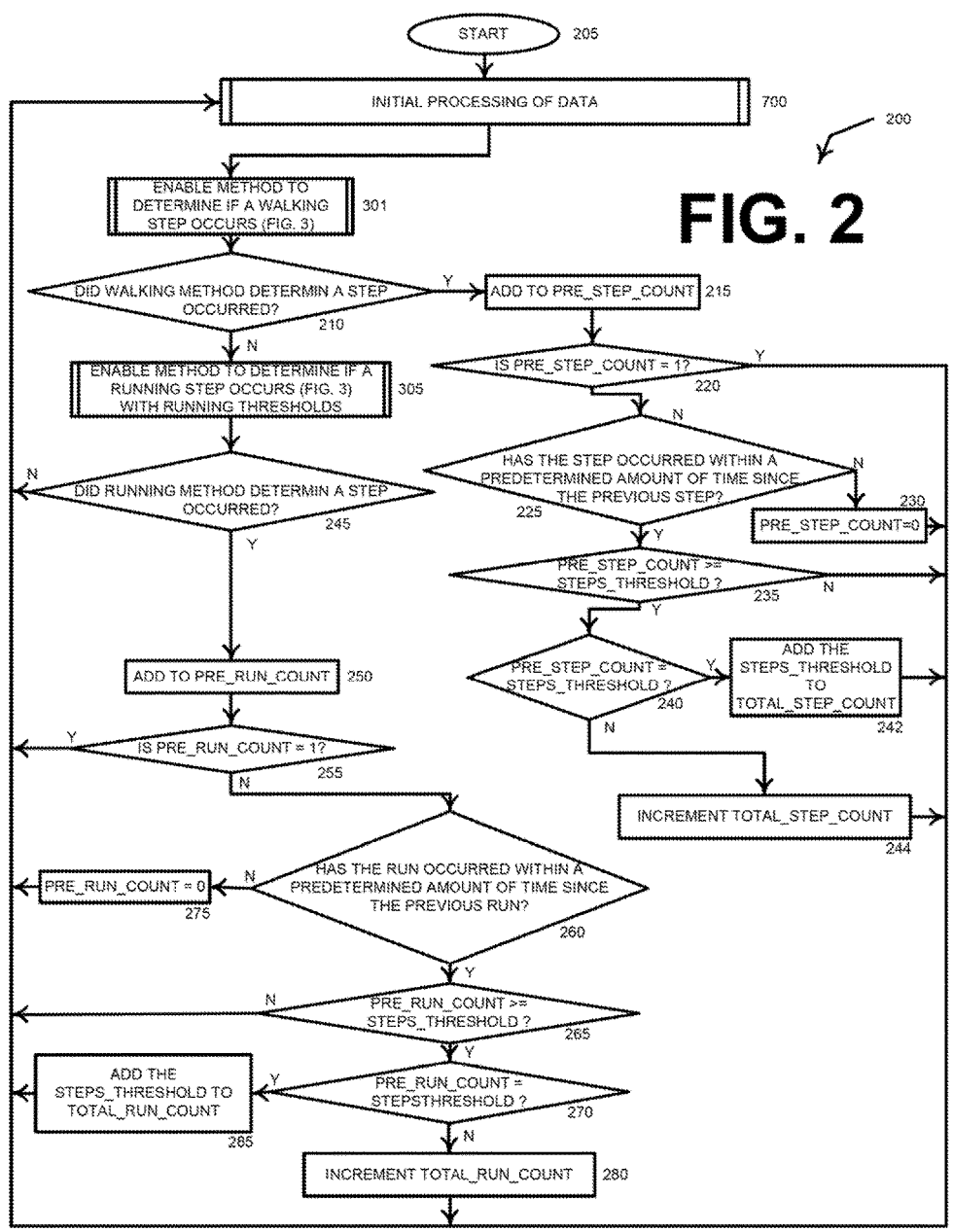
FIG. 2 illustrates a flow diagram of a method for counting walking steps and running steps by using a microprocessor and an accelerometer.

Turning now to FIG. 2, the figure illustrates a method 200 for determining both walking and running steps taken by a user of a mobile device having an accelerometer sensor, such as a smartphone, a pedometer, or a Mobile Personal Emergency Response System ("MPERS") device that contains pedometer functionality. Compared with method 100, an advantage of using method 200 is improved rejection of false indications of stepping motion by detection of and distinguishing between running steps, walking steps. The improvement over method 100 is partly due to use of separate criteria (time ranges and magnitude thresholds) for running and walking. Method 200 can also be used in detecting the difference between running steps and walking steps for the purpose of assigning greater calorie consumption to more strenuous activities for the purposes of reporting a user's activity.

Method 200 starts at step 205 and then advances to step 700 for initial processing of sampled data as discussed earlier in the discussion of FIG. 1. One period of the outputted filtered magnitude data corresponding to negative to positive, positive to negative, and negative to positive zero crossings is analyzed by method 300, called from step 301, to determine if a step occurs. Method 300, described in more detail in connection with FIG. 3, functions similarly to the functioning of method 100 with the exception that method 300 can process data with threshold values tailored to specific activity, for example, vis-à-vis running activity walking threshold values for detecting walking activity may have lower peak acceleration magnitude values and longer values between the zero crossings corresponding to the peak and minimum acceleration magnitude signature values due to a step impact. This improves accuracy by reducing false detections of steps when steps do not occur, e.g., when a pedometer device experiences an impact not caused by repetitive walking or running activity. Method 300 outputs an indication that a walking step has occurred, or if a triggering magnitude resulted from activity other than a walking step. If method 200 determines at step 210 that method 300 determined that a step occurred, step 215 increments a PRE_STEP_COUNT variable. If the value in the PRE_STEP_COUNT variable is 1, indicating that only one acceleration event that could correspond to a step has occurred, method 200 returns and continues to acquire and process data using method 700. If the determination at step 220 is that the value in PRE_STEP_COUNT variable does not equal 1, (i.e., the value is greater than 1 because it was incremented at step 215) method 200 follows the 'N' path from step 220 and advances to step 225.

The method then determines at step 225 whether the step recorded in PRE_STEP_COUNT occurred within a predetermined amount of time from the previous step incremented in PRE_STEP_COUNT. If this is not the case the 'N' path is followed and the method resets the PRE_STEP_COUNT to zero in step 230 and returns to step 700. Alternatively, if the determination at step 225 is that the action that caused the incrementing at step 215 occurred within a predetermined amount of time since the previous action that also caused an incrementing at step 215, step 225 follows the 'Y' path to step 235 where PRE_STEP_COUNT is compared to a STEPS_THRESHOLD to determine whether PRE_STEP_COUNT is greater than or equal to the STEPS_THRESHOLD. If the comparison at step 235 results in a value greater than the threshold, the method follows the 'Y' path to step 240. Otherwise, method 235 follows the 'N' path back to step 700. At step 240, the method makes a comparison to determine whether PRE_STEP_COUNT is equal to STEPS_THREHSOLD. If method 200 determines at step 240 that the value of the number of steps, which each occurred within the predetermined amount of time since its corresponding previous step equaled the STEPS_THRESHOLD, the method follows the 'Y' path from step 240 to step 242 and adds the amount of steps currently stored in STEPS_THRESHOLD to TOTAL_STEP_COUNT, which represents the number of walking steps determined in method 200. Thus, method 200 confirms that the actions, or events, that may be steps are actually steps before it adds their count to the total step count.

If the 'N' path is followed from step 240, method 200 moves to step 244 and TOTAL_STEP_COUNT is incremented. Using an equality as the condition to meet in step 240 prevents adding the value stored in the PRE_STEP_COUNT variable to the TOTAL_STEP_COUNT during a successive determination of a step (steps 215-235), thus ensuring that that the cumulative total number of steps stored in TOTAL_STEP_COUNT is only incremented by one for each determination that a step occurred within the predetermined period at step 225. After updating TOTAL_STEP_COUNT at step 244, method 200 returns to step/subroutine 700 where more data is obtained from a sensor to check for further steps.

Returning to discussion of step 210, if a determination is made that method 300 determined that no step (i.e., walking or running) has occurred, then method 200 calls subroutine 300 again at step 305 to determine if a running step has occurred. Method 300 analyzes the same sampled signal data as it did when called from step 301, but method 200 passes different thresholds/limits at step 305, corresponding to running activity, than is does when it passes threshold values corresponding to walking activity at step 301. Thus, method 300 determines if a running step has occurred using similar methodology as for determining walking activity, but using threshold/limit values specifically selected to correspond to running steps (based on empirical data).

The STEPS_THRESOLDS value can be different for the running or the walking portion of method 200 in order to improve the false positive rates. Typical values range between 5 and 10 steps. This STEPS_THRESHOLD value is a predetermined value that PRE_STEP_COUNT for walking activity and PRE_RUN_COUNT values are compared against to determine whether a predetermined number for potential steps (i.e., acceleration magnitude signals that exceed a magnitude threshold) occur within a predetermined period. As discussed above in connection with FIG. 1 and the walking activity determination portion of FIG. 2, using the PRE_STEP_COUNT and PRE_RUN_COUNT delays incrementing the TOTAL_STEP_COUNT variable until the value in either the PRE_STEP_COUNT or PRE_RUN_COUNT variables are determined to correspond to actual walking steps or running steps, respectively, rather than discrete, non-step events.

Method 300 outputs a signal that indicates whether a running step has occurred. If method 200 determines at step 245 that information returned from method 300 at step 305 does not indicate that a running step occurred, then the method goes back to collecting accelerometer data to determine whether more steps occur. If it is determined that a running step occurred then method 200 increments a PRE_RUN_COUNT variable at step 250.

After the PRE_RUN_COUNT has been incremented in step 250, method 200 progresses to step 255 where the method checks to determine whether PRE_RUN_COUNT is equal to 1 and if that is the case the method follows the 'Y' path to step 700 where more data is sampled from accelerometer sensors to determine whether another step occurs. If step 255 follows the 'N' path, the method determines at step 260 whether the step recorded in PRE_RUN_COUNT occurred within a predetermined amount of time from the most recent previous incrementing of PRE_RUN_COUNT at step 250. If this is not the case the 'N' path is followed from step 260, the PRE_RUN_COUNT to zero at step 275, and method 200 returns to step 700. Alternatively, if information from method 300 indicates a run step, method 200 follows the 'Y' path from step 260 to step 265 where PRE_RUN_COUNT is compared to STEPS_THRESHOLD to determine whether PRE_RUN_COUNT is greater than or equal to STEPS_THRESHOLD. If the comparison results in a value greater than the threshold, the method follows the 'Y' path to step 270. Otherwise, method 265 follows the 'N' path back to step 700. In step 270, the method makes a comparison to determine whether the value in PRE_RUN_COUNT is equal to STEPS_THREHSOLD, and if true, step 270 follows the 'Y' path to step 285 and adds the amount of steps stored in the STEPS_THRESHOLD variable to TOTAL_RUN_COUNT, which is the total number of walking steps determined in method 200. If the 'N' path is followed from step 270 method 200 moves to step 280 where TOTAL_RUN_COUNT is incremented and returns back to step 700.

Figure 3:
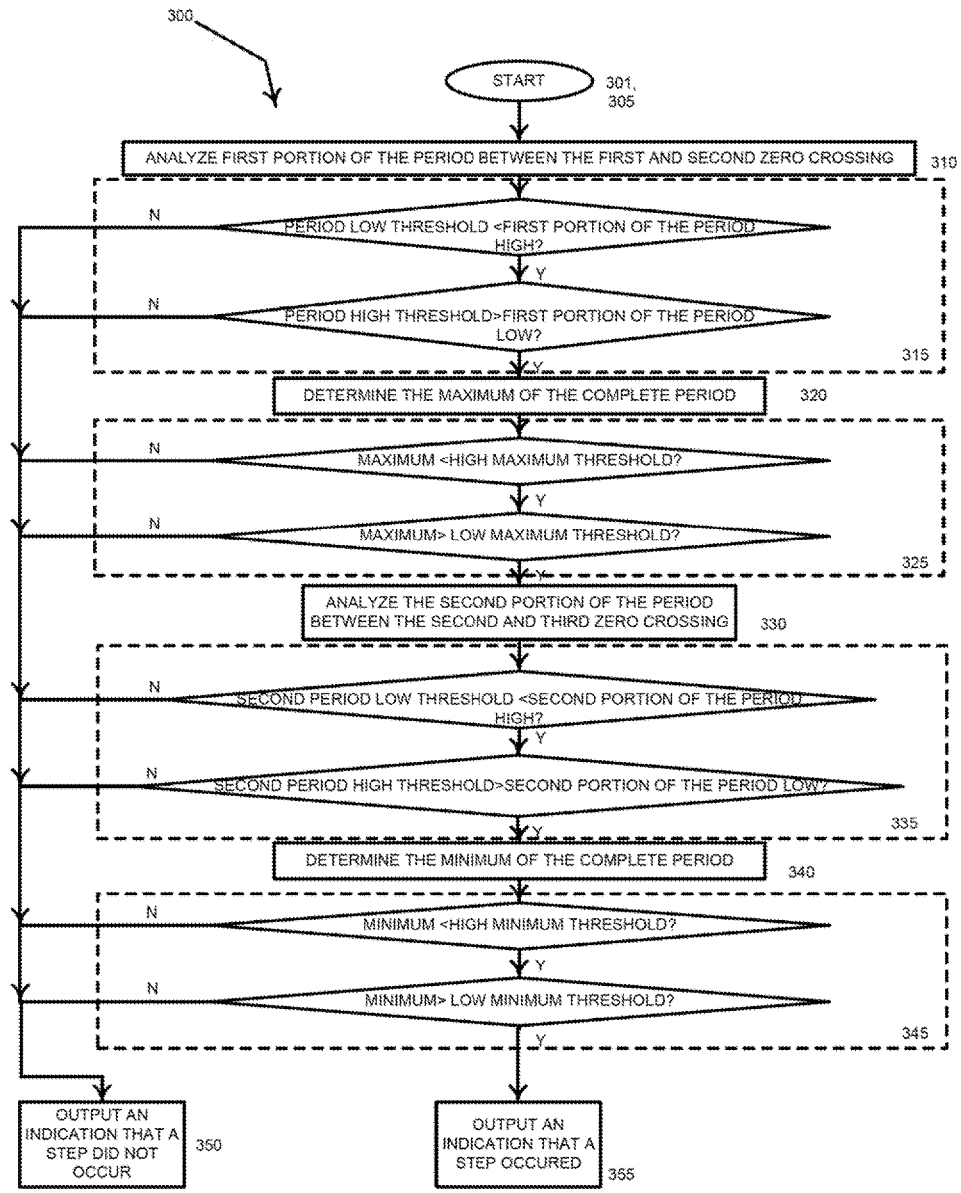
FIG. 3 illustrates a flow diagram of a stage in Method 200 to determine walking steps.

Turning now to FIG. 3, the figure illustrates a flow diagram of a method 300 that analyzes data processed according to method 700, described infra, and outputs an indication if, or information indicating whether, the data processed by method 700 corresponds to a walking step, a running step, or some other repetitive ambulatory activity by someone wearing a device performing the method. Examples of other activity that may be processed and determined as ambulatory may include jogging, swimming, riding a horse, climbing a ladder, etc. In the aspect illustrated in FIG. 3, method 300 distinguishes whether the ambulatory activity is walking or running according to evaluation of the data received from method 700 with predetermined criteria. The predetermined criteria may be user selectable, but preferably is selected based on empirical data. After analyzing empirical data, common traits are observed for walking compared to running. Specifically, running tends to have less time between stride impact, and each stride impact causes an accelerometer device worn by a runner to output a higher magnitude than walking stride impacts cause. Thus, when method 300 is called from step 301 from FIG. 2, for example, it receives walking impact magnitude and frequency thresholds and limits. And, when method 300 is called from step 305, it receives stride impact magnitude and frequency thresholds and limits that have been determined to define running movement. The data received from method 700 typically includes processed samples of data between, and including, samples where a sinusoidal curve crosses zero magnitude as shown in FIG. 7.

For purposes of discussion, depending on whether step 301 or 305 called routine 300, method 300 starts at either step 301 or step 305 respectively. Also for purposes of discussion, the thresholds discussed in connection with steps 315, 325, 335, and 345 may differ depending on whether it is evaluating data for determination of a walk or a run activity. If step 301 calls it, method 300 typically uses walk thresholds/limits, whereas it uses run thresholds/limits if step 305 in FIG. 2 calls it.

At step 310, the method (or processor running the method) analyzes the period between the first and second zero crossings, and compares the time between them to a low threshold and a high threshold at step 315. If the period corresponding to the time between the first and second zero crossings is not greater than the minimum period threshold and not less than the maximum period threshold, or limit, method 300 advances to step 350 and returns an indication that a step (either walk or run) has not occurred.

If, however, the period between the first and second zero crossing is greater than the minimum time threshold and less than the maximum time threshold, or limit, then method 300 advances to step 320, where it determines the maximum magnitude from the samples between the first and second zero crossings. At step 325, this maximum sample data magnitude is compared to low and high threshold values to determine whether the magnitude corresponds to a walk if called from step 301 or a run if called from step 305. If not, method 300 advances to step 350. However, if the maximum magnitude falls within the criteria, method 300 advances to step 330.

At step 330, method 300 determines the samples that correspond to the second zero crossing and a third zero crossing (the time between the first and second zero crossings and the second and third zero crossings compose a complete period of a signature of sampled step impact data from method 700). Step 335 compares the period between the second and third zero crossings to time threshold value limits. If the period between the second and third zero crossings does not fall between the time threshold limits for the second portion of the impact signature, then method 300 advances to step 350. If the period between the second and third zero crossings falls between the time threshold limits for the second portion of the impact signature, then method 300 advances to step 340, where the processor determines the minimum acceleration magnitude for the step acceleration magnitude signature, which will typically occur during the second portion of the signature between the second and third zero crossings. At step 345, the processor compares the minimum acceleration magnitude of the impact signature to predetermined second signature portion acceleration magnitude thresholds. If the minimum acceleration magnitude does not fall between the predetermined second signature portion acceleration magnitude thresholds, then method 300 advances to step 350 and returns an indication of no-step. If the minimum acceleration magnitude falls between the predetermined second signature portion acceleration magnitude thresholds, then method 300 advances to step 355 and returns an indication that a step has occurred.

FIG. 4 illustrates actual data that was taken from an accelerometer then processed with a band pass filter in accordance to method 700. The data obtained was X, Y, Z values from an accelerometer then the magnitude was taken followed by filtering to produce the plot shown in the figure. The data obtained was 76 running steps and 5 walking steps. Method 200 was then used to process the data and output where walking and running steps were detected. Shown in FIG. 4 are the indications of walking steps by (■) that the pedometer method determines are walking steps and running steps that the pedometer method determines are running steps indicated by (*) in the figure. As can be seen in the figure, method 200 classified the different running and walking steps.

Figure 5:
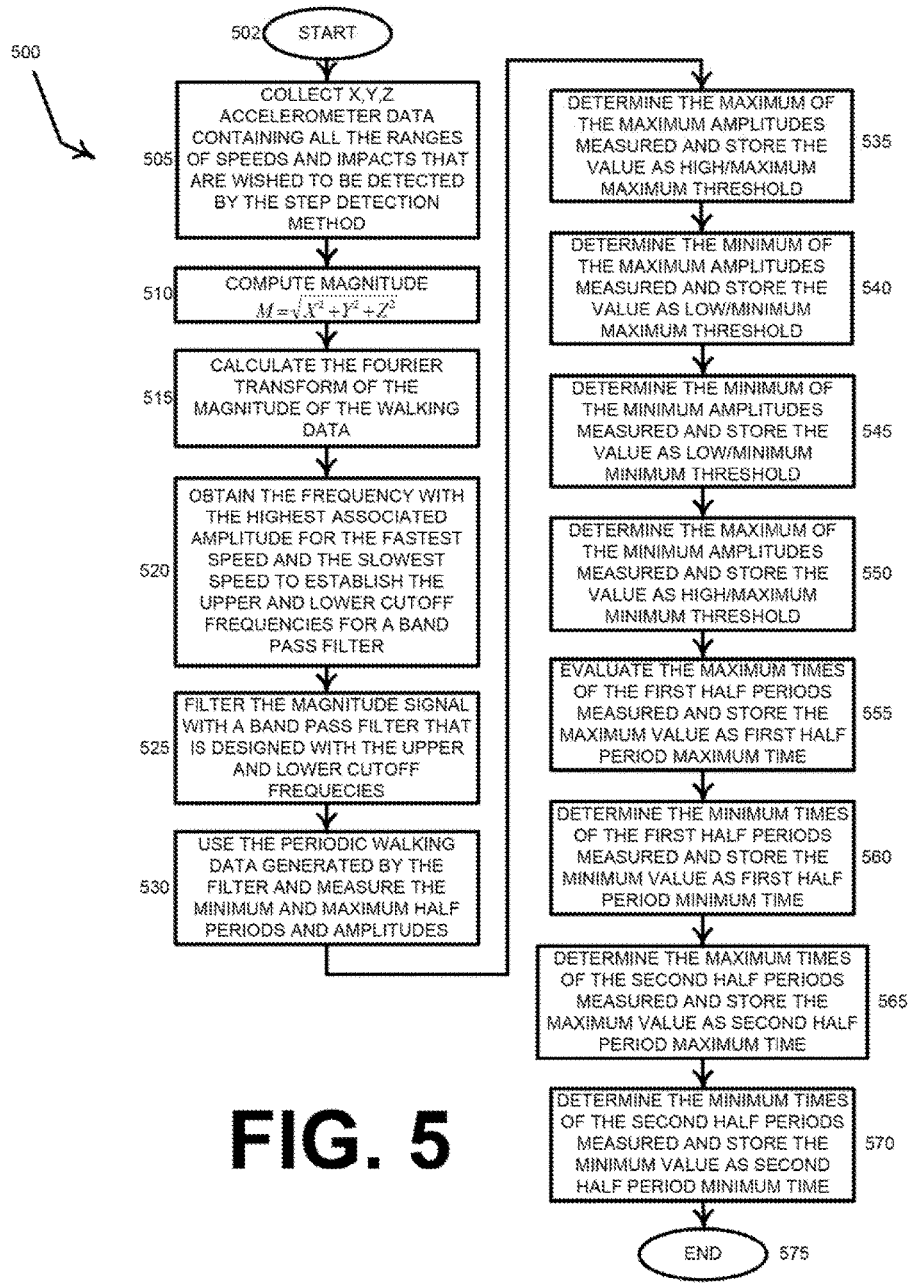
FIG. 5 illustrates a flow diagram of a method to determine the coefficients to establish the threshold values for the pedometer.

Referring now to FIG. 5, the figure illustrates how the threshold values are determined from recorded step datasets (i.e., running or walking activity). Data sets are collected for fast walking or running having high acceleration magnitude step impacts to establish the upper end of spectrum with regards to magnitudes obtained for these steps. For these types of fast step activities, a step impact tends to have higher frequency content associated with it than slower running or walking. Thus, the upper cutoff frequency of a band pass filter and the minimum size of a half period threshold tend to be higher frequency and shorter time, respectively. Likewise, the slowest walking speed with very little impact tends to result in lower thresholds for magnitudes that indicate a step impact, a lower cutoff frequency value for the band pass filter, and a longer time for the maximum values for the half period thresholds. The process for determining these values is outlined in method 500.

Returning to discussion of FIG. 5, the method starts at step 502. At step 505, a processor in a computer device, such as a pedometer, an MPERS, a smart phone, or other computer device running software collects X, Y, Z accelerometer data containing all the ranges of speeds and impacts that are wished to be detected by the step detection method. At step, 510 the processor in the computer device calculates a magnitude signal from the separate acceleration magnitudes comprising the X, Y, and Z accelerometer by performing a square root sum of the squares on the sampled data signal. At step 515, the processor calculates the Fourier transform of the magnitude signal of the walking/running data, and at step 520 determines the frequency with the highest associated amplitude for the fastest speed and also for the slowest speed to establish the upper and lower cutoff frequencies for a band pass filter. At step 520, the processor determines the frequencies having the highest associated amplitude for the fastest stepping speed and the slowest stepping speed. This establishes the upper and lower cutoff frequencies for a band pass filter, which will smooth raw sampled data acquired in the future to compare with magnitude and time thresholds. Comparing the smoothed sampled data with the thresholds determines whether indications of potential step impacts correspond to walking or running steps to be further analyzed. One of ordinary skill in the art will appreciate that the frequencies corresponding to the stepping activities spectrally compose the function that describes the impact of a given step. For example, when someone runs, the acceleration experienced by a point on their body, or on a point (i.e., an accelerometer sensor) on a device worn by the person, is higher in magnitude and typically shorter in duration than the acceleration experienced by the same point when the person is walking. Thus, time threshold developed from performing method 500 corresponds to the rise and fall of an acceleration signal generated from the impact of a step, not from the time between step impacts.

At step 525, the processor applies method 500 and filters the raw acceleration magnitude signal with a band pass filter that is designed with the upper and lower cutoff frequencies determined at step 520. At step 530, the processor evaluates the filtered data and determines minimum and maximum half-periods and amplitudes. It will be appreciated that half-periods refers to the time between a first and second zero crossing (plot of acceleration magnitude crossing the time axis as the acceleration magnitude transitions from negative to positive or positive to negative) and also the time between the second zero crossing and a third zero crossing for magnitude data, smoothed or raw (unfiltered), wherein the total time between the first and third zero crossings corresponds, and typically correlates, to peaks in the sampled data caused by step impacts.

At step 535, the processor determines the measured maximum of the maximum amplitudes from the multiple empirical data signatures, and stores it as a high maximum threshold (may also be referred to as maximum maximum threshold). At step 540, the processor determines the measured minimum of the maximum amplitudes from the multiple empirical data signatures, and stores it as a low maximum threshold may be referred to as minimum maximum threshold). Thus, if when comparing a maximum acceleration value from a filtered acceleration signature acquired in the future the maximum acceleration value from said signature either exceeds or does not meet the maximum or minimum maximum magnitude threshold, respectively, then the processor evaluating the future data signature may determine that the maximum acceleration magnitude from the signature it just acquired does not correspond to a step impact. If a maximum magnitude from a signature acquired in the future does not meet the thresholds determined in steps 535 and 540, then the action that caused it most likely is not from a step. Rather, if the maximum magnitude evaluation currently under evaluation does not meet the minimum maximum threshold for the first half-period, the action is likely the result of noise in, sensed by, or bumping of, a device containing the accelerometer sensor that acquired it. If the maximum magnitude evaluation under evaluation exceeds the maximum maximum threshold for the first half-period, the action is likely the result of a high-force impact, such as striking of the device having the accelerometer against a hard surface or a hard bump against such a rigid hard surface.

Similar to method steps 535 and 540, at steps 545 and 550 the processor processing the multiple empirical step activity signals determines the minimum of the minimum amplitudes measured (minimums because the magnitudes between the second and third zero crossing for a given impact signature correspond to negative acceleration) and stores the value as a low minimum magnitude threshold (or minimum minimum magnitude threshold) and determines the maximum of the minimum amplitudes and stores the value as a high minimum threshold (or maximum minimum magnitude threshold). Thus, comparing the minimum magnitude from the second half period of unknown data (unknown whether a step impact from a walk or a run step caused a given magnitude swing) with the minimum and maximum minimum magnitude thresholds further refines the determination that a given smoothed impact signature results from a walking or running step impact event, or from some other type of event. The comparison of the second half period minimum magnitude to the corresponding thresholds refines the determination because after a person's foot and shoe and the walking (or running) surface compress after a step impact, they also uncompress with a characteristic that typically differs from decompression that follows an impact of the device containing the accelerometer sensor with another object.

After determining in steps 535 and 540 the minimum and maximum acceleration magnitude thresholds for use in comparing a positive magnitude increase from a first portion (first half period) of what may be a signature of a step impact, and after determining at steps 545 and 550 the minimum, or negative, minimum and maximum acceleration magnitude thresholds, at steps 555, 560, 565, and 570, method 500 determines minimum and maximum time thresholds to be used in a comparison to magnitude changes in a smoothed signal from an accelerometer device in the future. For example, if the time between a first zero crossing and a second zero crossing is too long, the acceleration is probably due to a non-step motion, such as swaying while standing. If the period between the first and second zero crossing is shorter than the minimum time threshold, then the signal being compared thereto is likely due to the accelerometer device striking, or being struck by, a rigid, hard material or surface. Similarly, the period of decompression following an acceleration magnitude increase typically has identifiable and repeatable characteristics, such as time between the smoothed acceleration magnitude signal transitioning from positive to negative and then back to positive occurring within the empirically determined second minimum and maximum time thresholds. Thus, when method 500 ends at step 575, it has determined minimum and maximum threshold values (both time and acceleration magnitude thresholds) for use in comparing with a first portion of a magnitude increase and a second portion of the magnitude increase (the second portion typically corresponding to a decompression portion following an acceleration impact spike) from multiple empirical data signatures acquired from multiple stepping activities (i.e., walking and running by test personnel wearing a device that includes an accelerometer that acquires the empirical data sets).

Turning now to FIG. 7, the figure illustrates a flow diagram of method 700, discussed supra, for acquiring and processing data for comparison to the time and magnitude thresholds/limits discussed above in connection with FIGS. 1-3 and 5. Method 700 starts at step 705. At step 710, a processor in a computer device, for example a pedometer, a smart phone, a tablet, a personal computer, or other device having an accelerometer built into it, acquires data from an accelerometer sensor, or from multiple sensors such as a 3-axis accelerometer sensor/device, and stores to a memory, such as a register, memory device, hard drive, flash drive, or other type of data storage means. It will be appreciated that if the device that includes the accelerometer has a means for transferring data to another device, such as transceiver for communicating via a long range wireless link (i.e., cellular telephony/data link), a short range wireless link (i.e., Bluetooth or WAN), a wired network such as the Internet or a Local Area Network), a computer device other than the device having the accelerometer may perform the steps of method 700, or even the steps of the methods described in connection with the other figures herein. The accelerometer data received from the accelerometer sensor/device may comprise digital samples of acceleration events acting upon the accelerometer sensor. Or, the accelerometer data may be an analog data signal, which the processor, or A to D circuitry, may receive and convert to digital samples.

Regardless of the format the accelerometer outputs acceleration data, at step 715, the processor determines the magnitude for each digital sample of a signal output from the accelerometer sensor. If the accelerometer is a single axis accelerometer, this step can be bypassed since the magnitude would equal the acceleration value indicated by the sample (the square root of a number is the number). If the accelerometer sensor outputs acceleration signals corresponding to multiple axes, the processor computes the square root sum of the squares of the samples for the multiple axes acquired substantially concurrently with one another.

At step 720, the processor performs a band-pass filter operation on the magnitude data resulting from step 715, and stores to a memory for use in additional evaluation.

At step 725, the processor evaluates the samples that have been stored in the memory (typically a FIFO buffer). The evaluation determines a first negative to positive zero crossing, shown in the figure at the left of the graphical representation of the function that bests fits the filtered acceleration magnitude samples. The evaluation also determines the second zero crossing, which is a positive to negative crossing, as well as determining a third zero crossing shown at the right of the graphical representation of step 725. This function shown in step 725 of the flow diagram represents a typical signature of an impact event caused by a stepping action, wherein acceleration magnitude samples are filtered with a band pass resulting in a shape that resembles a sinusoid, but may not be a perfect sine wave. The portion of the function shown between the first and second zero crossings may be referred to as a first half period and the portion between the second and third zero crossings may be referred to as the second half period of the impact function, or signal. This signature, or signal, represents spectral makeup of the portion of a person's gait corresponding to their foot impacting a walking, or running, surface—the total period of the signature may not necessarily correspond to the period between step impacts, even if the person is walking or running with a consistent gait at a consistent rate.

At step 730, the processor isolates the time of the first, second, and third zero crossings relative to each other, as well as the corresponding acceleration magnitude peaks (positive direction for the first portion of the signature and negative for the second portion of the signature). At step 740, the processor determines the time, or number of samples, between the first and second zero crossings and the time between the second and third zero crossings. Method 700 ends at step 740, and passes the peak magnitude values and the time/period lengths for the first and second portions of the signature to the method that called it for further evaluation and comparison to threshold limit values as discussed elsewhere herein.

Turning now to FIG. 8, the figure illustrates a slightly different representation of a step impact signature than the one shown in step 725 of the flow chart illustrating method 700. In FIG. 8, the signature contains filtered acceleration magnitude data for a first step impact event and for a second step impact event. The figure shows that the first and second portions, or half-'periods,' of either impact signatures do not correspond to the period of a person's gait while walking or running. The gait period would be the time between corresponding points on the first and second impact magnitude signatures, such as the first zero crossing for each, or perhaps the peak acceleration magnitude during the first portion of each.

Reset To Ground Level of a Height Determination Method

Figure 6:
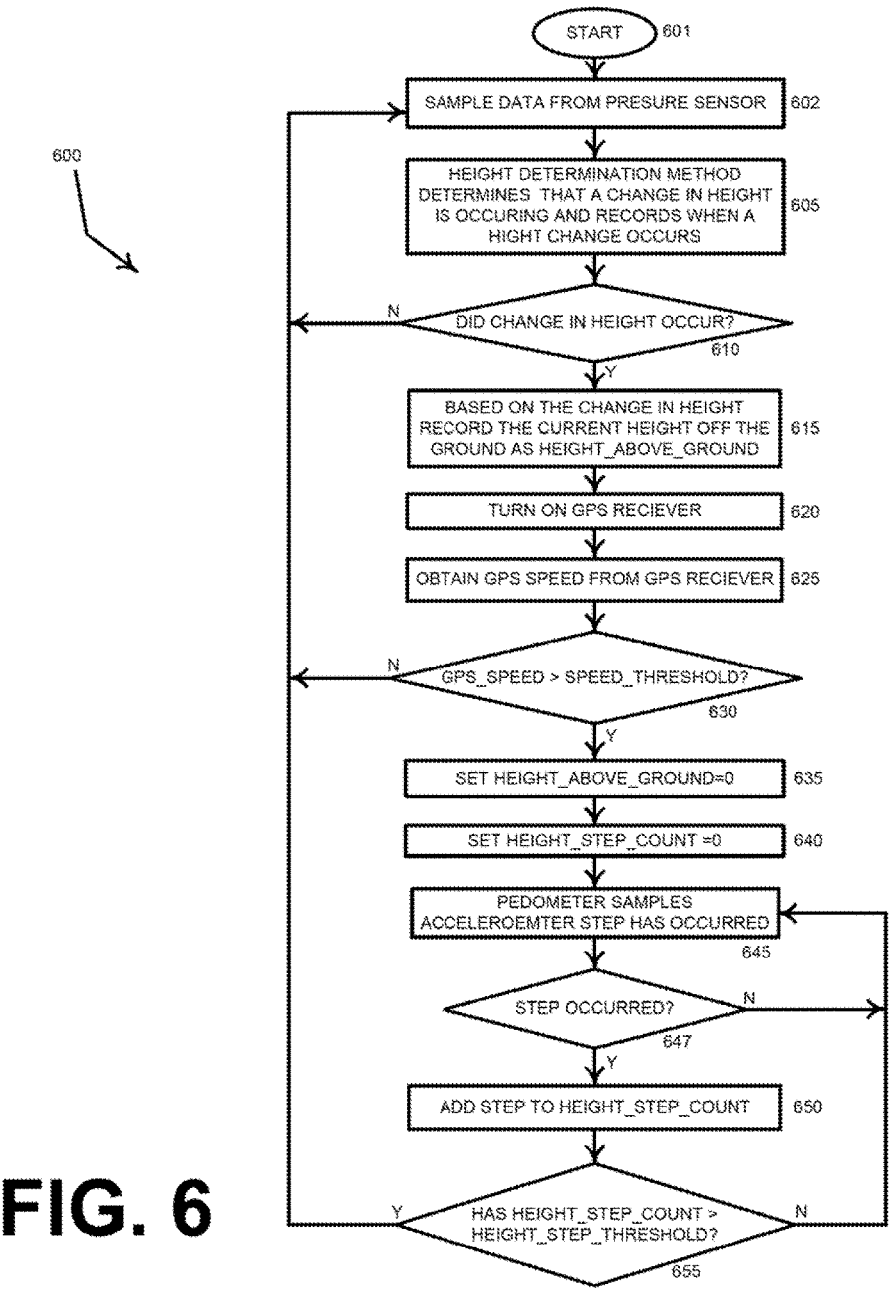
FIG. 6 illustrates a reset to ground level for a method to determine the height above ground.

Method 600 uses a height determining method and a pedometer method, such as any of the pedometer methods described herein. An example of a height determining method is one that senses changes in pressure, such as the Height Determination Method described in U.S. patent application Ser. No. 13/719,122, which is incorporated herein in its entirety. The Height Determination Method samples pressure from a pressure sensor and determines the change in height based off of using the slope of sampled points that indicate a change in pressure occurs within a determined amount of time. By knowing how much the pressure changes it can be inferred how high the device's physical placement is off the ground when the device is traveling in an elevator or up or down stairs. Other activities that produce pressure changes occur when the device is in a vehicle or airplane because of pressure changes that translate from altitude changes from going up or down hills in a vehicle or ascending or descending in an aircraft. An indication of speed greater than a typical human running speed as determine by a GPS circuit in a mobile device can be used to determine that the mobile device is moving with a vehicle, and if so, reset the height above ground value to zero. Such resetting of the height above ground value occurs often in a moving vehicle. However, traveling in a vehicle as the elevation of the vehicle changes does not affect the indication by a mobile device of its location in a building, and thus a GPS circuit in the device needlessly uses power while in a moving vehicle. Therefore, determining that height is changing due to a reason other than walking, running, or climbing stairs can function as a means for temporarily turning off a device's GPS circuit while the device is likely in a vehicle. Turning the GPS circuitry back on when pedometer algorithms embodying the methods described herein, including method 600, indicate that a wearer of a device having an accelerometer is actually taking steps, which typically happens while outside of a vehicle allows the device's GPS circuitry to remain off while the wearer is not moving himself, or herself, around with their legs, but resets the height above ground to zero substantially as soon as the wearer begins moving using their own legs to walk or run. Therefore, detecting occurrence of steps provides a means for resetting the height above ground value in a height determining method running in a device after being located in a vehicle and thus reduces power use of a GPS circuit when the information it provides is not needed with respect to the height determining method. In addition to reducing power consumption by the GPS circuitry, using the detection of steps to reset a height above ground value can also bypass the running on the processor of the height determining method, which typically invokes operation of a power-consuming pressure sensor device. Although it has many purposes, an aspect of determining height is to judge the distance from the ground level to the device's height above ground level stored in the variable HEIGHT_ABOVE_GROUND indicated in FIG. 6. Determining height of the device based on a comparison to an elevation following a previous change in height typically induces error associated with each change in height, and the error is typically additive. For example, changes in pressure resulting from traveling in a vehicle over hilly terrain typically induces cumulative error in the indication of ground level. Thus, method 600 determines when a mobile device is traveling in a vehicle and corrects, or prevents, regular updating of the HEIGHT_ABOVE_GROUND variable. In addition, as discussed above, method 600 also reduces the amount of battery usage while sampling pressure values from a pressure sensor and obtaining GPS speed with the GPS sensor.

The Method 600 describes a way to reset a mobile device containing a pressure sensor to calculate the distance above a ground height to a ground height level value of zero when traveling in a vehicle.

At step 601 the method starts.

At step 602 samples are taken from a pressure sensor and values representing the samples are stored to a memory device having a predetermined size for storing a predetermined number of sample values.

At step 605, the method calculates from the predetermined number of sample values a height above ground value.

At step 610, the height above ground value is used to determine a change in height of the device. The absolute value of the height above ground value is compared to a threshold value empirically determined, for example, by typical changes in height for elevators or traveling up or down stairs. If the absolute value of the change in height exceeds the threshold then the method progresses to 615. If the change in pressure is less than the empirically determined threshold value then the method returns to step 602. Going up or down hills in an automobile also generates an altitude change great enough to progress to 615.

At step 615 the change in height calculated from the pressure sensor change is used to adjust a current height. The current height is stored in the value HEIGHT_ABOVE_GROUND.

At step 620, the processor running method 600 causes the GPS receiver to turn on and method 600 progresses to step 625.

At step 625, a value representing speed along the ground is retrieved from the GPS circuitry.

At step 630, if the horizontal speed is greater than a typical speed that an automobile travels, then the method determines that the device must be traveling in a vehicle and progresses to 635. Otherwise, the method determines that the device must be in an elevator so it progresses to 602 to and continues monitoring potential height changes from the samples continuously stored in the memory have a predetermined size (e.g., samples are stored in a FIFO buffer).

At step 635, based on a GPS speed along the ground indicating speed higher than human running speed, the height determining device is presumed to be on a person riding in a vehicle. Since vehicles operate on the ground, the value in the HEIGHT_ABOVE_GROUND variable is set to zero and GPS circuitry is, or can be, turned off.

At step 640 a counter value that represents the steps taken after a person wearing a mobile device exits a vehicle is set to zero At step 645, the processor running method 600 samples data from an accelerometer sensor.

At step 647 the processor analyzes data sampled from the accelerometer to determine whether a step has occurred by a user of the mobile device running method 600. If the pedometer determines that a step has been taken then it progresses to 650. If analysis of the accelerometer sensor samples does not indicate a step taken, the method returns to step 645.

At step 650 a HEIGHT_STEP_COUNT variable is incremented to indicate a step has been taken.

655 when the value in HEIGHT_STEP_COUNT indicating the number of steps taken reaches a predetermined step threshold selected based on an amount of indication of potential steps that could potentially occur during a vehicle ride (i.e., number of bumps of a device, or other non-step actions that could indicate a step) method 600 returns to step 602. Otherwise, method 600 returns to 645 and continues monitoring acceleration data for more indications of steps.

Method 600 provides advantages, one of which is reduced power consumption. Setting the HEIGHT_ABOVE_GROUND variable to zero and turning off the GPS circuitry while the mobile device is traveling in a vehicle, when the device is always at ground level, eliminates power consumption of the GPS circuitry that would only confirm that the HEIGHT_ABOVE_GROUND variable should be zero while the device is in the vehicle. Also, the height determination algorithm is not needed while the mobile device is moving in a vehicle, because it would indicate that the device is at ground level. Thus, using the determination of actual steps by a user resulting from analyzing signals from the accelerometer serves as a trigger and eliminates the need for consuming power to run the GPS circuitry and processing height determination steps when the device is at ground level. The pedometer algorithm thus serves as a trigger for causing the GPS circuitry and height determination algorithms to operate to update the height above ground of a user.

Other Applications of Method 600

Method 600 can be applied to pairing a device to an automobile or automatically enabling a vehicle mode that could change devices such as mobile phones, or navigation systems into vehicle mode to better located a device. A vehicle mode can also be disabled automatically by using this method. For example, if a mobile smart phone was set to "vehicle mode" that had a different display for better operation in the vehicle to be less distractive or enable or disable certain features of the GPS enabled mobile device, an indication by method 600 of steps taken can take the device out of "Vehicle Mode" or place it into "Vehicle Mode" by looking at the step count. If the device is not set in vehicle mode the method can determine once the user goes down a hill to enable this mode in the device automatically. When HEIGHT_ABOVE_GROUND is equal to zero, pair the device with a vehicle mobile device, such as a telematics device or an entertainment/infotainment head unit device, as it is moving with the vehicle if not already paired or in "Vehicle Mode". Furthermore, the mobile device containing a method to determine the height above ground by means of using a Height Determination Method can be used in conjunction with a device, RFID, Wireless communications module, or other electronic device placed within a vehicle to reset the HEIGHT_ABOVE_GROUND equal to zero. A method contained within a mobile device containing the Height Determination Method pairs with a device placed in a vehicle via Bluetooth, Wi-Fi, near field communications, or other forms of wireless communications in order to alert the device that it is within a vehicle. Once the device is acquires an indication that it is in fact within a vehicle the device resets HEIGHT_ABOVE_GROUND equal to zero and disables the Height Determination Method and GPS circuitry until the mobile device is no longer within range of Bluetooth, Wi-Fi, near field communications, or other forms of wireless communications within the vehicle. Alternatively, once the mobile device containing the Height Determination Method acquires an indication of its proximity to the vehicle via Bluetooth, Wi-Fi, near field communications, or other forms of wireless communications, the device disables the Height Determination Method, sets HEIGHT_ABOVE_GROUND equal to zero, and disables GPS instrumentation until steps are sensed by a pedometer that indicates that the device has been removed from the vehicle. By disabling the Height Determination Method and GPS circuitry while the device is traveling within a vehicle, power is saved by not running the sensor components and the processor can be placed into a lower power mode. Another important aspect of disabling the Height Determination Method while traveling within a vehicle is pressure changes as a result of traveling up or down hills falsely cause the method to calculate changes in height even though the car remains in contact with the ground thus being at ground height. The methods outlined in this invention remedy potential problems associated with this false calculation of heights in the vehicle and improve the overall performance of the method by recognizing that the mobile device is on the ground and resetting the HEIGHT_ABOVE_GROUND equal to zero.

What is claimed is:

1. A device for counting steps, comprising:
   a processor to:
   collect acceleration data, associated with a user of the device, from an accelerometer sensor;
   determine a magnitude signal based on the acceleration data collected from the accelerometer sensor;
   determine, based on determining the magnitude signal, a first frequency of a first amplitude associated with a fastest stepping speed;
   determine, based on determining the magnitude signal, a second frequency of a second amplitude associated with a slowest stepping speed;
   establish a filter using the first frequency and the second frequency,
      the first frequency being an upper cutoff frequency of the filter, and
      the second frequency being a lower cutoff frequency of the filter;
   apply the filter to the magnitude signal;
   determine based on applying the filter to the magnitude signal:
      a minimum half period time threshold associated with the user of the device,
      a first half period magnitude threshold associated with the user of the device, and
      a maximum half period time threshold associated with the user of the device;
   receive sampled pressure data from a pressure sensor;
   determine, based on the sampled pressure data, that a change in height above ground by the device has occurred;
   determine, via a (Global Positioning System) GPS circuit and based on determining the change in height above ground by the device, a speed value associated with the device;
   reset, based on the speed value satisfying a speed threshold, a height above ground value;
   turn off, based on the speed value satisfying a speed threshold, the GPS circuit;
   receive sampled acceleration data;
   determine magnitude acceleration information based on the sampled acceleration data;
   determine based on the magnitude acceleration information:
      a first negative-to-positive acceleration change,
      a positive-to-negative acceleration change succeeding the first negative-to-positive acceleration change, and
      a second negative-to-positive acceleration change;
   compare a first half period time value and the minimum half period time threshold,
      the first half period time value corresponding to a first amount of time between the first negative-to-positive acceleration change and the positive-to-negative acceleration change;
   compare the first half period time value and the maximum half period time threshold;
   compare, based on the first half period time value satisfying the minimum half period time threshold and the maximum half period time threshold, a magnitude acceleration value, corresponding to the first half period time value, and the first half period magnitude threshold;
   compare, based on the magnitude acceleration value satisfying the first half period magnitude threshold, a second half period time value to the minimum half period time threshold,
      the second half period time value corresponding to a second amount of time between the positive-to-negative acceleration change and the second negative-to-positive acceleration change;
   compare the second half period time value and the maximum half period time threshold;
   determine that a step has occurred based on the second half period time value satisfying the minimum half period time threshold and the maximum half period time threshold;
   turn on the GPS circuit based on determining that the step occurred; and
   output a step signal indicating that the step has occurred.

2. The device of claim 1, wherein the processor is further to:
   increment a pre-step count value based on the step signal indicating that the step has occurred; and
   add the pre-step count value to a total step count value based on the pre-step count value reaching a predetermined quantity of step counts.

3. The device of claim 2, wherein the pre-step count value is reset based on the step not occurring within a predetermined amount of time after a previous step indication.

4. The device of claim 1, wherein the processor is further to:
   filter the sampled acceleration data with a band-pass filter to generate filtered magnitude acceleration information; and
   wherein the processor, when comparing the first half period time value and the minimum half period time threshold, is to:
      compare the first half period time value and the minimum half period time threshold using values corresponding to the filtered magnitude acceleration information.

5. The device of claim 1, where the magnitude acceleration value is a first magnitude acceleration value;

wherein the processor is further to:
compare a second magnitude acceleration value, corresponding to the second half period time value, and a second half period magnitude threshold; and
wherein the processor, when determining that the step has occurred, is to:
determine that the step has occurred based on the second magnitude acceleration value satisfying the second half period magnitude threshold.

6. The device of claim 1, where the magnitude acceleration value is a first magnitude acceleration value; and
wherein the processor is further to:
compare, based on the second half period time value satisfying the maximum half period time threshold, a second magnitude acceleration value, corresponding to a second half period magnitude acceleration, with a second half period magnitude threshold.

7. The device of claim 1, wherein the processor is further to:
compare a minimum acceleration value to a magnitude acceleration threshold; and
wherein the processor, when determining that the step has occurred, is to:
determine that the step has occurred based on the minimum acceleration value satisfying the magnitude acceleration threshold.

8. The device of claim 1, wherein the device is a pedometer.

9. The device of claim 1, wherein the acceleration data is associated with one of:
a walking activity of the user, or
a running activity of the user.

10. A method, comprising:
collecting, by a device, acceleration data, associated with a user of the device, from an accelerometer sensor;
determining, by the device, a magnitude signal based on the acceleration data collected from the accelerometer sensor;
determining, by the device and based on determining the magnitude signal, a first frequency of a first amplitude associated with a fastest stepping speed;
determining, by the device and based on determining the magnitude signal, a second frequency of a second amplitude associated with a slowest stepping speed;
establishing, by the device, a filter using the first frequency and the second frequency,
the first frequency being an upper cutoff of the filter, and
the second frequency being a lower cutoff of the filter;
applying, by the device, the filter to the magnitude signal;
determining by the device and based on applying the filter to the magnitude signal:
a minimum half period time threshold associated with the user of the device,
a first half period magnitude threshold associated with the user of the device, and
a maximum half period time threshold associated with the user of the device;
receiving, by the device, sampled pressure data from a pressure sensor;
determining, by the device and based on the sampled pressure data, that a change in height above ground by the device has occurred;
determining, by the device, via a (Global Positioning System) GPS circuit, and based on determining the change in height above ground by the device, a speed value associated with the device;
resetting, by the device and based on the speed value satisfying a speed threshold, a height above ground value;
turning off, by the device and based on the speed value satisfying a speed threshold, the GPS circuit;
receiving, by the device, a sampled acceleration data;
determining, by the device, magnitude acceleration information based on the sampled acceleration data;
determining, by the device, based on the magnitude acceleration information:
a first negative-to-positive acceleration change,
a positive-to-negative acceleration change succeeding the first negative-to-positive acceleration change, and
a second negative-to-positive acceleration change;
comparing, by the device, a first half period time value and the minimum half period time threshold,
the first half period time value corresponding to a first amount of time between the first negative-to-positive acceleration change and the positive-to-negative acceleration change;
comparing, by the device, the first half period time value and the maximum half period time threshold;
comparing, by the device and based on the first half period time value satisfying the minimum half period time threshold and the maximum half period time threshold, a magnitude acceleration value, corresponding to the first half period time value, and the first half period magnitude threshold;
comparing, by the device and based on the magnitude acceleration value satisfying the first half period magnitude threshold, a second half period time value to the minimum half period time threshold,
the second half period time value corresponding to a second amount of time between the positive-to-negative acceleration change and the second negative-to-positive acceleration change;
comparing, by the device, the second half period time value and the maximum half period time threshold;
determining, by the device, that a step has occurred based on the second half period time value satisfying the minimum half period time threshold and the maximum half period time threshold;
turning on, by the device and based on determining that the step occurred, the GPS circuit; and
outputting, by the device, a step signal indicating that the step has occurred.

11. The method of claim 10, further comprising:
incrementing a pre-step count value based on the step signal indicating that the step has occurred; and
adding the pre-step count value to a total step count value based on the pre-step count value reaching a predetermined quantity of step counts.

12. The method of claim 11, further comprising:
resetting the pre-step count value based on the step not occurring within a predetermined amount of time after an immediately previous step indication.

13. The method of claim 10, further comprising:
filtering the sampled acceleration data with a band-pass filter to generate filtered magnitude acceleration information; and
wherein comparing the first half period time value and the minimum half period time threshold comprises:
comparing the first half period time value and the minimum half period time threshold using values corresponding to the filtered magnitude acceleration information.

14. The method of claim 10, where the magnitude acceleration value is a first magnitude acceleration value; wherein the method further comprises:
comparing a second magnitude acceleration value, corresponding to the second half period time value, and a second half period magnitude threshold; and
wherein determining that the step has occurred comprises:
determining that the step has occurred based on the second magnitude acceleration value satisfying the second half period magnitude threshold.

15. The method of claim 10, where the magnitude acceleration value is a first magnitude acceleration value; and where the method further comprises:
comparing, based on the second half period time value satisfying the maximum half period time threshold, a second magnitude acceleration value, corresponding to a second half period magnitude acceleration, with a second half period magnitude threshold.

16. The method of claim 15, where the second magnitude acceleration value corresponds to a minimum magnitude acceleration value associated with the second half period time value.

17. The method of claim 10, further comprising:
comparing a minimum acceleration value of a second half period to a magnitude acceleration threshold; and
wherein determining that the step has occurred comprises:
determine that the step has occurred based on the minimum acceleration value of the second half period satisfying the magnitude acceleration threshold.

18. The method of claim 10, where the magnitude acceleration value corresponds to a maximum magnitude acceleration value associated with the first half period time value.

19. A non-transitory computer-readable medium storing instructions, the instructions comprising:
one or more instructions that, when executed by one or more processors of a device, cause the one or more processors to:
collect acceleration data, associated with a user of the device, from an accelerometer sensor;
determine a magnitude signal based on the acceleration data collected from the accelerometer sensor;
determine, based on determining the magnitude signal, a first frequency of a first amplitude associated with a fastest stepping speed;
determine, based on determining the magnitude signal, a second frequency of a second amplitude associated with a slowest stepping speed;
establish a filter using the first frequency and the second frequency,
the first frequency being an upper cutoff frequency of the filter, and
the second frequency being a lower cutoff frequency of the filter;
apply the filter to the magnitude signal;
determine based on applying the filter to the magnitude signal:
a minimum half period time threshold associated with the user of the device,
a first half period magnitude threshold associated with the user of the device, and
a maximum half period time threshold associated with the user of the device;
receive sampled pressure data from a pressure sensor;
determine, based on the sampled pressure data, that a change in height above ground by the device has occurred;
determine, via a (Global Positioning System) GPS circuit and based on determining the change in height above ground by the device, a speed value associated with the device;
reset, based on the speed value satisfying a speed threshold, a height above ground value;
turn off, based on the speed value satisfying a speed threshold, the GPS circuit;
receive sampled acceleration data;
determine magnitude acceleration information based on the sampled acceleration data;
determine based on the magnitude acceleration information:
a first negative-to-positive acceleration change,
a positive-to-negative acceleration change succeeding the first negative-to-positive acceleration change, and
a second negative-to-positive acceleration change;
compare a first half period time value and the minimum half period time threshold,
the first half period time value corresponding to a first amount of time between the first negative-to-positive acceleration change and the positive-to-negative acceleration change;
compare the first half period time value and the maximum half period time threshold;
compare, based on the first half period time value satisfying the minimum half period time threshold and the maximum half period time threshold, a magnitude acceleration value, corresponding to the first half period time value, and the first half period magnitude threshold;
compare, based on the magnitude acceleration value satisfying the first half period magnitude threshold, a second half period time value to the minimum half period time threshold,
the second half period time value corresponding to a second amount of time between the positive-to-negative acceleration change and the second negative-to-positive acceleration change;
compare the second half period time value and the maximum half period time threshold;
determine that a step has occurred based on the second half period time value satisfying the minimum half period time threshold and the maximum half period time threshold;
turn on the GPS circuit based on determining that the step has occurred; and
output a step signal indicating that the step has occurred.

20. The non-transitory computer-readable medium of claim 19, wherein the one or more instructions, when executed by the one or more processors, further cause the one or more processors to:
increment a pre-step count value based on the step signal indicating that the step has occurred; and
add the pre-step count value to a total step count value based on the pre-step count value reaching a predetermined quantity of step counts.

* * * * *